Sept. 4, 1962  G. W. POSTMA  3,052,836
METHOD FOR MARINE ELECTRICAL PROSPECTING
Filed Dec. 24, 1957  4 Sheets-Sheet 1

INVENTOR:
G. W. POSTMA
BY: J. H. McCarthy
HIS AGENT

Sept. 4, 1962          G. W. POSTMA          3,052,836

METHOD FOR MARINE ELECTRICAL PROSPECTING

Filed Dec. 24, 1957          4 Sheets-Sheet 3

INVENTOR:
G. W. POSTMA
BY: J. H. McCarthy
HIS AGENT

Sept. 4, 1962 G. W. POSTMA 3,052,836
METHOD FOR MARINE ELECTRICAL PROSPECTING
Filed Dec. 24, 1957 4 Sheets-Sheet 4

INVENTOR
G.W. POSTMA
BY
*Theodore E. Bieber*
HIS ATTORNEY

United States Patent Office 3,052,836
Patented Sept. 4, 1962

3,052,836
METHOD FOR MARINE ELECTRICAL
PROSPECTING
Gerrit W. Postma, Houston, Tex., assignor to Shell Oil
Company, a corporation of Delaware
Filed Dec. 24, 1957, Ser. No. 705,066
2 Claims. (Cl. 324—1)

This invention relates to a method and apparatus for detecting and mapping of shallow faults in marine electrical prospecting of earth formations covered by bodies of water. The invention is directed to the characterizing of earth formations on the basis of their electrical property, and more particularly, it relates to determining the electrical properties of portions of the earth by measuring the mutual impedance between two or more circuits to determine the earth mutual impedance.

It is known that electrical properties of portions of the earth can be determined by coupling a generator with the earth to form a current circuit that circulates a current through the earth, coupling a pick-up circuit to a portion of the earth to which the current is circulating to receive an induced electromotive force due to the transfer of mutual impedance between the pick-up circuit and the current circuit, and measuring the electromotive force received by the pick-up circuit, which electromotive force is proportional to the mutual impedance and the current in the current circuit. The portion of the mutual impedance dependent on the constitution of the earth is, if the position of the two circuits with respect to each other is kept unchanged, representative of the electrical properties of the earth, and may be designated as the earth mutual impedance. However, there is inherently a certain amount of coupling between the circuits that is independent of the earth. This coupling may be designated as the external mutual impedance of the current and pick-up circuits.

The mutual impedance between the current and pick-up circuits consists of the earth mutual impedance supplemented by the external mutual impedance, both of these impedances varying with changes in the frequency of the current in the current circuit. The electromotive force induced in the pick-up circuit varies with changes in the mutual impedance as well as with variations in the current.

The frequency of the current circulating through the earth can be readily held constant by generator-controlling arrangements, but it is difficult to control the magnitude of the source current at any of the frequencies at which it is desired to measure the mutual impedance. Complex and expensive arrangements are required to insure that the current maintains a constant magnitude in a circuit containing varying impedances. Even with a generator that is capable of supplying an electromotive force of constant magnitude, the magnitude of the circulating current varies. These variations are due to changes in the impedance of the current circuit due, for example, to changes in the position relative to the earth of the instrument cables employed and, as the case may be, to the connection of the circuits with the earth, and to changes in the constitution of the earth. It is in the nature of the measurements obtained in making an electrical earth survey, that the relative position of the measuring device with respect to the earth may change at any time during the running of a survey for the object of the measurements taken during a survey is to determine differences in the constitution of the earth when electrical sensing equipment is connected to different portions of the earth. Therefore variations occur in the impedance of the current circuit, and as a consequence variations in the magnitude of the circulating current, whenever there are changes in the earth structure traversed during the survey.

It is a primary object of this invention to provide a method and apparatus for detecting and mapping of shallow faults and formation contacts in the earth's surface which lie underneath bodies of water.

A further object of the present invention is to provide a method for determining the earth mutual impedance by taking measurements which are independent of the magnitude of the current circulating in the current circuit, said measurements being taken in a manner which makes it possible to account for the amount of external mutual impedance.

Another object of this invention is to provide a method for determining the earth's mutual impedance wherein both the in-phase and out-of-phase components of the earth mutual impedance are measured directly and recorded continuously.

These and other objects of this invention will be understood from the following description taken with reference to the drawing, wherein.

Figure 1:
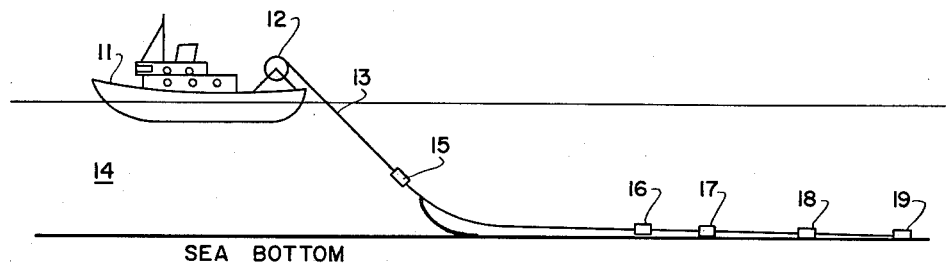
FIGURE 1 is a diagrammatic view of a boat towing the necessary equipment along an ocean floor to practice the method of the present invention.

In FIGURE 1 of the drawing, a boat 11 is shown as having a cable winch 12 mounted thereon from which a long electrical cable 13 trails in the water 14 behind the boat 11. Fixedly secured to the cable and electrically connected thereto are at least two current electrodes 15 and 16 and two pick-up electrodes 17 and 18. If desired one or more additional pick-up electrodes 19 may be employed. The distances between the various electrodes 15 to 19 may vary considerably up to a distance of a thousand feet or more. The distance selected between the various elements usually depends upon the terrain to be surveyed. The current electrode 16 and the pick-up electrodes 17, 18 and 19 must move through the water near the sea bottom, that is, within a few feet thereof. While the current electrode 15 is shown as being connected in the cable and dragged through the water, this current electrode may also be close to the boat or part of the boat itself. However, in order to reduce the effect of variations in water depth, it is preferable that the electrode 15 also is close to the bottom.

The apparatus shown in FIGURE 1 may be used for continuously and simultaneously recording the real and imaginary, components of a transfer impedance involving properties of portions of the earth consisting of a layer of sea water and the bottom materials underneath.

With an alternating current, supplied by a generator (not shown), flowing between current electrodes 15 and 16, two transfer impedances are available for measurement when three pick-up electrodes are employed. The first transfer impedance is measured in the pick-up circuit which contains the electrodes 17 and 18 while a second transfer impedance is measured in the pick-up circuit which contains the electrodes 18 and 19.

Figure 2:
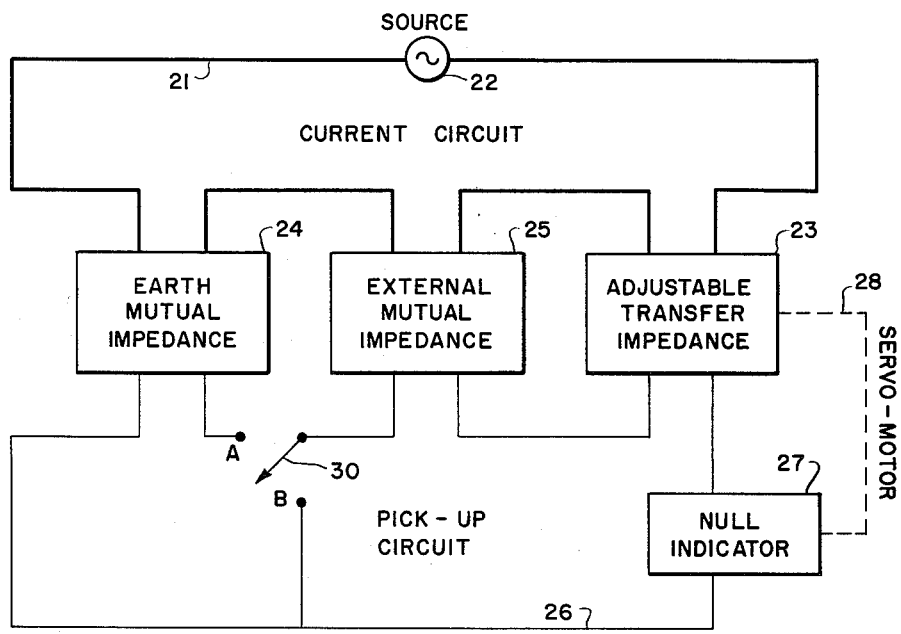
FIGURE 2 is a schematic diagram illustrating the principle of the present method of mutual impedance exploration.

The principle of the invention is diagrammatically illustrated in FIGURE 2 wherein the heavy line 21 on the left connects an alternating current generator 22 with an adjustable transfer impedance 23, the earth mutual impedance 24 and the unwanted but unavoidable external mutual impedance 25 inherently present in the system, which combination of elements represents the current circuit. The earth mutual impedance 24 represents the mutual impedance between an insulated piece of cable grounded at the current electrodes 15 and 16 and another piece of insulated cable grounded at the electrodes 17 and 18, or 18 and 19 as the case may be, of FIGURE 1.

The generator 22, which may be of any desired type, causes a current to circulate in the current circuit. The current which goes through the current circuit, that is, through the earth mutual impedance 24, the external mutual impedance 25 and the adjustable mutual impedance 23, induces an electromotive force in the pick-up circuit represented by the thin line 26 in the lower half of the drawing. The electromotive force induced into the pick-up circuit causes a current to flow in the pick-up circuit, the presence of which is sensed by a null indicator of any well known type. The adjustable transfer impedance 23 produces a counter electromotive force that can be adjusted to balance out the electromotive force induced into the pick-up circuit by means of the earth mutual impedance and the external mutual impedance. By simple adjustment of the adjustable transfer impedance 23, the current in the pick-up circuit 26 can be reduced to zero. This may be done by either manually adjusting the adjustable transfer impedance 23, or by connecting the null indicator 27 to the adjustable transfer impedance 23 by a servo-motor system which is represented by the broken line 28. A reading in micro-ohms is then obtainable from the adjustable transfer impedance 23 which is proportional to the counter electromotive force produced by adjustable transfer impedance 23 and hence is proportional to the earth mutual impedance.

When the current in the pick-up circuit 26 is zero, without the current in the current circuit 21 being zero, the sum of the electromotive forces induced through the adjustable transfer impedance device 23, the external mutual impedance and the earth mutual impedance, must be zero for the impedance in the pick-up circuit is finite. This means that the adjustable transfer impedance device 23 is, after adjustment, set at a value that is equal and opposite to the sum of the external and earth mutual impedances. The value of the adjustable transfer impedance may be read off the indicator means provided in the instrument 23. The proper relation between the indication of the indicator means and the value of the adjustable transfer impedance can be found by calibration.

By means of a switch 30, the earth mutual impedance can be excluded from the pick-up circuit 26, so that when the current in the pick-up circuit is reduced to zero by changing the setting of the adjustable transfer impedance 23, a value is obtained which is equal and opposite to the external mutual impedance alone, which value provides a zero base for future measurements made by the instrument.

The earth mutual impedance can then be determined by first measuring the value of the adjustable transfer impedance with the switch 30 in position A (taking care that the null indicator 27 shows that there is no current in the pick-up circuit) to determine the sum of the external and earth mutual impedances. A second measurement is made with the switch 30 in position B, to determine the external mutual impedance alone. A difference between the first and second measurements equals the earth mutual impedance.

During the actual measurements taken along an extensive portion of the earth, the earth mutual impedance varies, while the external mutual impedance of a measuring apparatus of good design and construction remains constant. Care is taken that the adjustable transfer impedance is adjusted continually so that the current in the pick-up circuit remains zero. This can be done manually, but is preferably accomplished with the help of a servo-system. The adjustment of the adjustable transfer impedance is recorded continuously and therefore yields a record of the sum of the external and earth mutual impedances when the switch is in position A. A single measurement with the switch 30 in position B suffices to determine the constant external mutual impedance, which is subtracted from the measured sum of the external and the earth mutual impedances to yield a value equal to the earth mutual impedance alone.

In the practical embodiment of the invention the switch 30 is located inside the cable close to one of the pick-up electrodes. The switch 30 is operated from the boat by means of a suitable relay. Insulated wires inside the cable connect the relay with a switch and batteries on the boat.

In the practicing of the present invention, it is immaterial as to how the generator 22 in the current circuit 21 is coupled to the earth. This may be accomplished by means of electrodes, by capacitive or inductive means, or otherwise. The adjustable transfer impedance consists preferably of a passive network of any suitable type well known to the art. It is likewise immaterial how the null indicator in the pick-up circuit is coupled to the earth. This coupling may, for instance, be effected by means of electrodes, or by capacitive or inductive means. The method of coupling may be the same as, or different from, the coupling to the earth in the current circuit.

As measurements are being made by use of alternating current, it is to be understood, that in general, the electromotive forces induced in the pick-up circuit 26 are not in phase with the current in the current circuit 21, nor with each other. In order to reduce the current in the pick-up circuit to zero, it is necessary that the vector sum of all electromotive forces be zero. This then requires that the adjustable transfer impedance is adjustable with respect to both magnitude and phase shift. In order to make the proper adjustments on the adjustable transfer impedance, it is necessary that the null indicating device indicate the phase, and to a certain extent, the amplitude, of the current in the pick-up system, that is, the null indicator must show whether there is a current in the pick-up circuit, and if there is, the phase of the current.

As will be described hereinbelow with regard to FIGURE 3 of the drawing, the preferred way of accomplishing the proper adjustment of the adjustable transfer impedance is to split it into two transfer impedances, in a manner such that one (the real component) induces an electromotive force into the pick-up circuit which is in phase with the current in the current circuit, while the other (the imaginary component) induces an electromotive force in the pick-up circuit which is 90° out of phase with the current in the current circuit. Likewise, the null indicator device can consist of two parts, one of which senses or indicates the component of the current in the pick-up circuit caused by an electromotive force which is in phase with the current in the current circuit, while the other part senses or indicates the component of the current in the pick-up circuit caused by an electromotive force which is 90° out of phase with the current in the current circuit. By recording for purposes of comparison both the real (in-phase) and imaginary (out-of-phase) components of the adjustable transfer impedance as two separate traces on a recording device, a more accurate analysis may be made of the underwater formations traversed by the surveying apparatus.

A variation of the above procedure is to provide two adjustable transfer impedances which induce in the pick-up circuit electromotive forces which have known phase shifts with respect to the current in the current circuit, phase shifts which are not necessarily zero or 90°, as in the above-described case. Likewise the null detector may consist of two parts which detect components of the current in the pick-up circuit which do not necessarily correspond to electromotive forces in the pick-up circuit in or 90° out of phase with the current in the current circuit. Many variations of the above described arrangements are possible, all of which have in common two different and independent adjustments on the adjustable transfer impedance, so that the electromotive force induced by it in the pick-up circuit can have any phase shift with respect to the current in the current circuit and any magnitude within a specified range.

The null indicator preferably has two independent sensing elements, so that it can indicate the phase relationship between the currents in the pick-up circuit with respect to the current in the current circuit. It is not necessary that each of the sensing elements of the null indicator be capable of indicating that component of the current in the pick-up system which is controlled by the adjustment of a corresponding part of the adjustable transfer impedance. However, the smooth operation of the system benefits from such correspondence between pairs of elements of the null indicator and the adjustable impedance.

Whatever the arrangement, it is necessary that the null indicator be provided with means to compare the phase of the current in the pick-up circuit to the phase of the current in the current circuit. Such means are described with regard to FIGURE 3 which is an elaboration of FIGURE 2. The principal difference between FIGURES 2 and 3 is that the adjustable transfer impedance 23 of FIGURE 2 has been split in four parts 31, 32, 33, and 34 in FIGURE 3 which will be explained herein below. The null indicator 27 of FIGURE 2 is split into two parts 35 and 36 in FIGURE 3, and a fixed transfer impedance 37 is indicated, intended to provide a reference voltage to which the null indicator can compare the phase of the current in the pick-up circuit. The total adjustable transfer impedance now consists of four adjustable transfer impedances.

Figure 5:
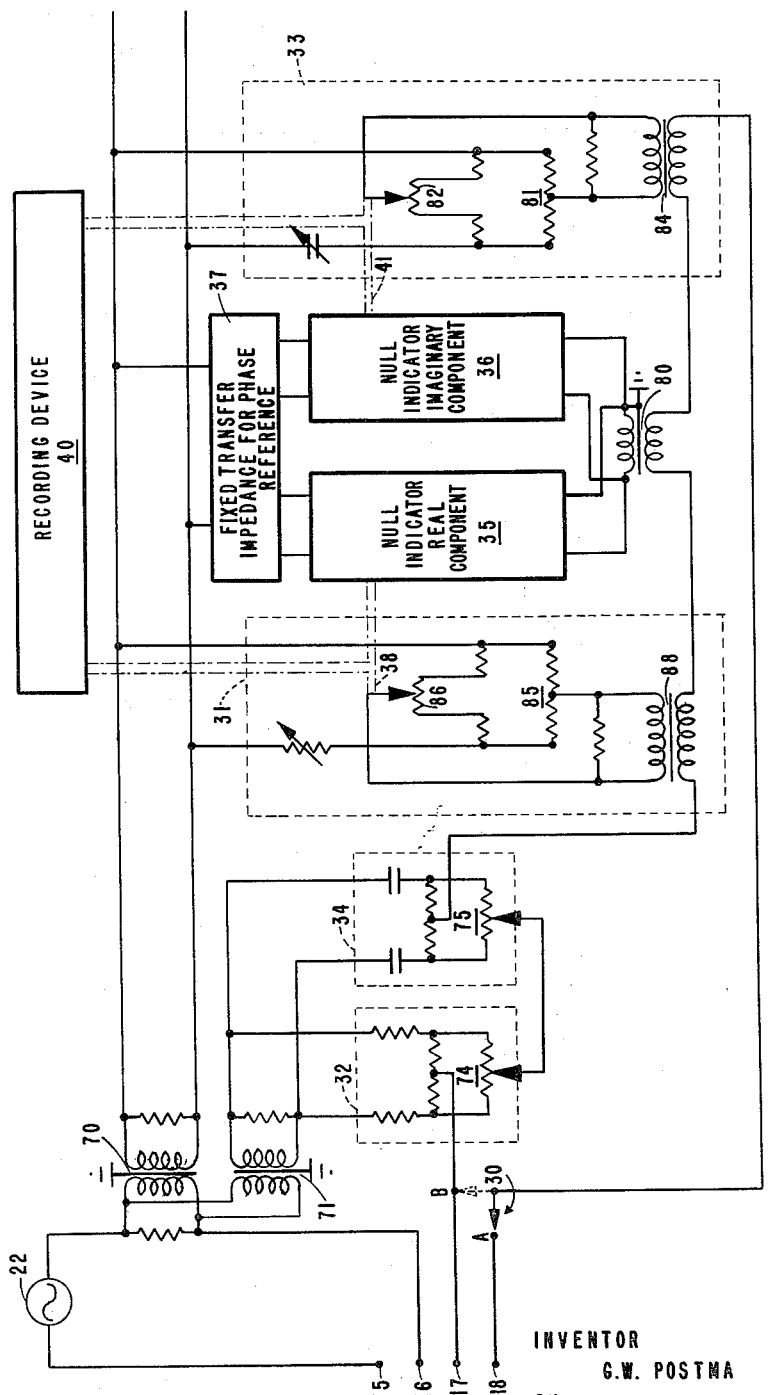
FIGURE 5 is a schematic drawing showing the detailed construction of part of the circuit shown in FIGURE 3.

The first of these transfer impedances 31, which is deignated as adjustable transfer impedance real component recording, consists of mainly a resistance network or bridge 85 shown in FIGURE 5 so that the electromotive force it induces in the pick-up circuit is substantially in phase with the current in the current circuit. The network 31 also contains such elements as a transformer 83 which separates the potential circuit from the current circuit so as to avoid the possibility of current circulating from the current circuit into the pick-up circuit by straight conduction. The network also contains a variable resistance element 86 for changing the magnitude of the electromotive force induced in the pick-up circuit without affecting its phase relation to the current in the current circuit. The variable resistance 86 is controlled thru mechanical linkage 38 by the null indicator 35 of the real component, to be described hereinbelow. The null indicator 35 is capable of operating the element in a manner such that the real component of the current in the pick-up circuit is reduced substantially to zero. The output potential of the bridge 85 has the opposite polarity of the error signal in the pick up circuit and is coupled to the pick up circuit by a transformer 88. The position of the variable element is indicated by any suitable type of recording device 40, such for example as a pen holder with a moving paper film.

The second of the four adjustable transfer impedances, designated as adjustable transfer impedance real component zero position 32, is similar to the above described transfer impedance 31. The transfer impedance 32 includes a variable bridge 74 that induces an electromotive force in the pick-up circuit substantially in phase with the current circuit while at the same time it is separated from the current circuit by a transformer 71. If desired, the same transformer may be employed for both the first and second adjustable transfer impedances 31 and 32. The difference between the first and second adjustable transfer impedances 31 and 32 is that the variable elements in the latter are set manually and are not in general changed during the taking of measurements by the present method. The function of the second adjustable transfer impedance is to zero the recording device 40 as well as shift the range of the recording device 40, for example, to prevent a pen on a recorder from running off the paper. This is done by inducing in the pick-up circuit an extra electromotive force, in phase with the current circuit, so that the corresponding component of a current in the pick-up system can be reduced to zero by adjustments within the possible range of variation of the first adjustable transfer impedance 31. In other words, the second adjustable transfer impedance may be set so that the pen remains on the paper during the measurements.

It may occasionally be necessary to adjust the second adjustable transfer impedance 32 during the taking of a measurement when the pen appears to run off the paper, but it is undesirable to make these adjustments within too short intervals of time. In order to restrict the number of occasions where the pen exceeds its limits, at least the first one of these adjustable transfer impedances can be set manually so that the relation between the variation of the variable elements and the variations in the electromotive force induced in the pick-up circuit can have any of a number of assigned values.

The third of the transfer impedances 33, designated as adjustable transfer impedance imaginary component recording, consists of an electrical bridge 81 arranged so that the electromotive force induced in the pick-up circuit is substantially 90° out-of-phase with the current in the current circuit. The bridge 81 is designed to separate the current circuit from the pick-up circuit, in a manner described with regard to the first adjustable transfer impedance 31 and it also contains variable element 82 controlled through a mechanical linkage 41 by a second null indicator 36. The position of the variable element 82 in the impedance network is recorded in a manner similar to that described with regard to the first adjustable transfer impedance 31, either on the same recorder 40 or on a separate recorder. The output potential of the bridge 81 has the opposite polarity of the imaginary signal in the pick up circuit and is coupled to the pick up circuit by a transformer 84.

The fourth adjustable transfer impedance 34 is similar to the third one 33. It includes a bridge 75 that induces an electromotive force substantially 90° out of phase with respect to the current in the current circuit, but the variable element of this impedance is adjusted manually in a manner and with a purpose similar to that described for the second adjustable transfer impedance 32.

The function of the null indicator of the present system is the detection of a current in the pick-up circuit and the phase relation of this current with respect to the current in the current circuit. In the arrangement shown in FIGURE 3, the null device is made up of two separate and largely identical systems. The first null detector 35, designated as null indicator real component, is activated preferably when the current in the pick-up circuit has a component which can be suppressed by variation of the first adjustable transfer impedance 31. When the null indicator 35 is thus activated, it produces, for instance by means of a motor and mechanical linkage an adjustment of the variable element of the first adjustable transfer impedance 31 so as to reduce the current component to which the null indicator is responsive.

Figure 3:
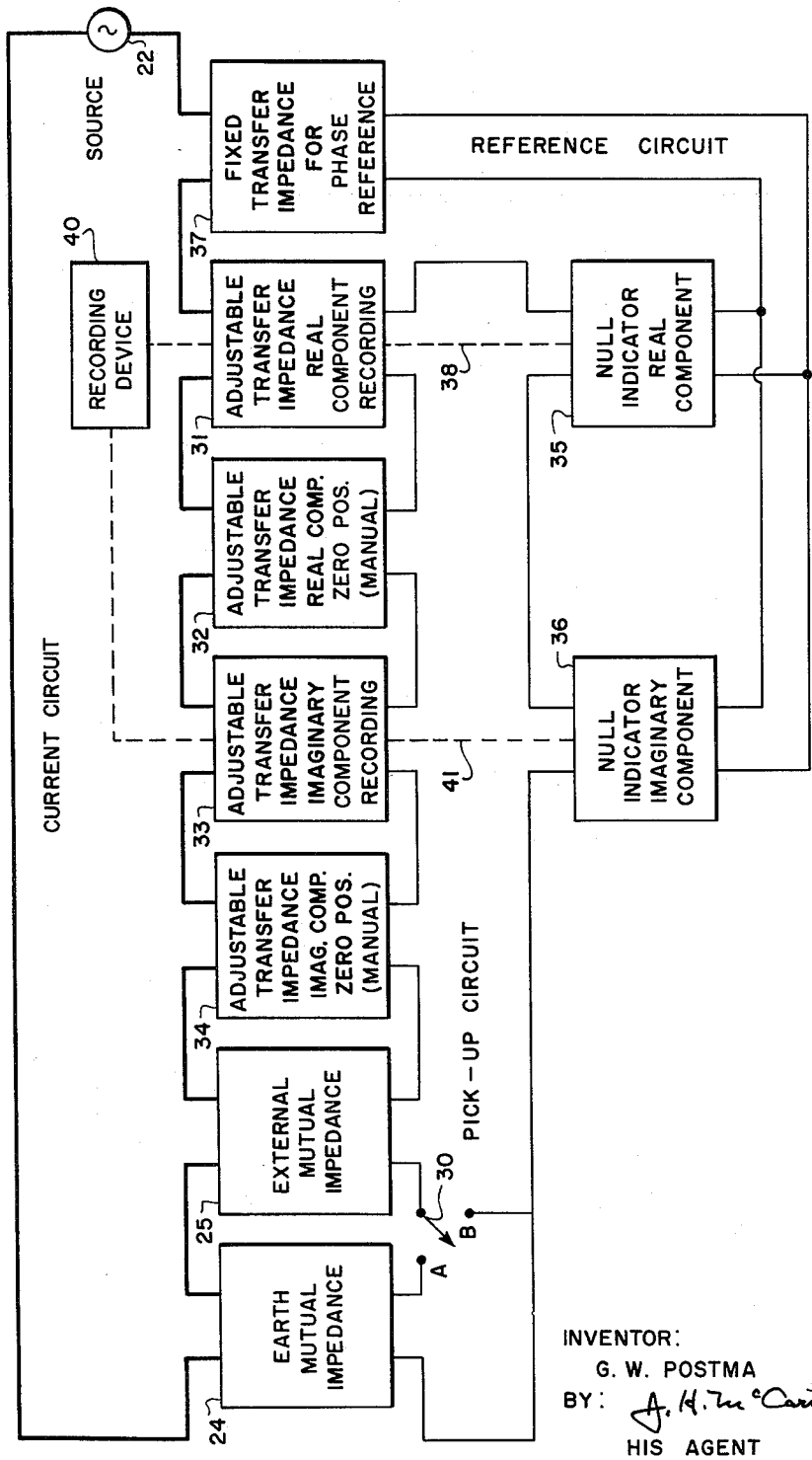
FIGURES 3 and 4 are diagrammatic views showing the principal components for carrying out exploration of underwater formations.

In order that the null indicator 35 be able to react to a specific component of the current in the pick-up circuit, a reference voltage is provided by means of a fixed transfer impedance for phase reference 37, as shown in FIGURE 3. This transfer impedance also functions as a means of separating the reference circuit from the current circuit. The second null indicator 36 is similar to that described with regard to null indicator 35.

In principle, it is only necessary that the two null indicators be sensitive to a different phase of the current in the pick-up circuit. It is possible then to reduce this current to zero, or to such a small value that the null detectors are no longer activated. The final position of the first and third adjustable transfer impedances 31 and 33 is not affected by the phases of the components of the current in the pick-up circuit to which the respective null indicators are sensitive. In practice, however, it is desirable that these components are such that they can be suppressed by one single corresponding adjustable transfer impedance. It is then possible to leave out one null indicator and its corresponding adjustable transfer impedance, and to measure only the component of the earth mutual impedance which corresponds to the remaining adjustable transfer impedance.

Figure 4:
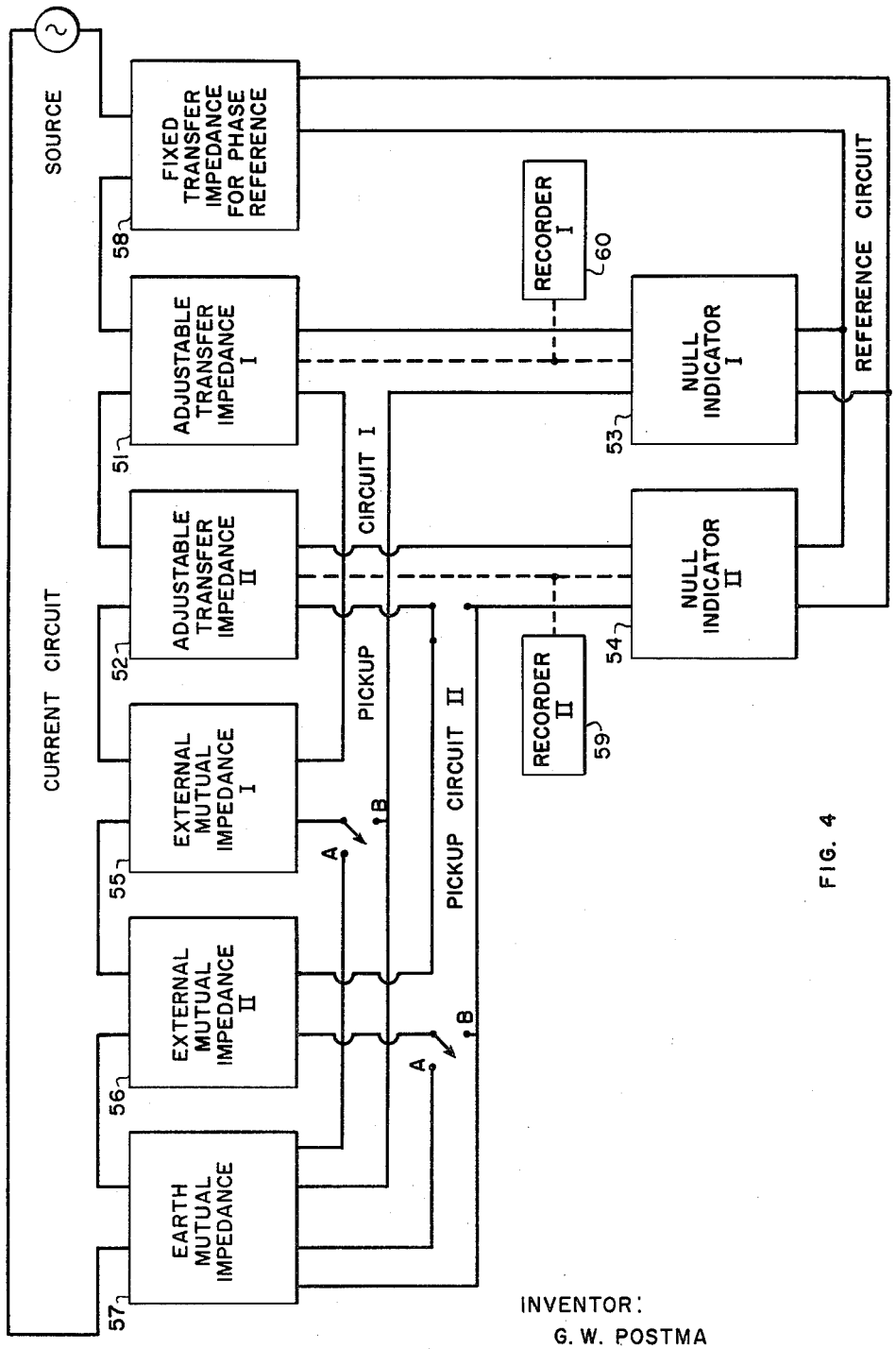

The above described method can be extended to measure simultaneously earth mutual transfer impedances when a single current circuit is employed with a plurality of pick-up circuits in a manner illustrated in FIGURE 4 of the drawing. As previously mentioned with regard to FIGURE 1, when three pick-up electrodes 17, 18 and 19 are employed there will be two earth mutual transfer impedances which may be recognized and measured. The first transfer impedance will exist between the current circuit and the circuit containing the pick-up electrodes 17 and 18 while the second transfer impedance will exist between the current circuit and the circuit containing the pick-up electrodes 18 and 19.

Thus, by adding a second pick-up circuit to the system shown in FIGURE 2, the new system will be equipped with a pair of adjustable transfer impedances 51 and 52 as shown in FIGURE 4 and a pair of null indicators 53 and 54 for resetting the adjustable transfer impedances 51 and 52 so that two earth mutual impedances may be recognized and simultaneously recorded on two recorders 59 and 60. A fixed transfer impedance 58 is also provided for phase reference.

I claim as my invention:

1. A method of geophysical exploration for surveying and characterizing earth formations beneath a body of water which comprises moving a current circuit through the body of water in close proximity to the bottom thereof, moving an electrical pick-up circuit along substantially the same path through the water in the vicinity of the current circuit, passing an alternating current through the current circuit into the earth adjacent thereto whereby at least a portion of said current emerges from said earth adjacent said pick-up circuit and induces an electromotive force into said pick-up circuit, the earth between said current and pick-up circuits forming an earth mutual impedance, inducing a counter electromotive force in the pick-up circuit to bring the current flow in the pick-up circuit to substantially zero by imposing a transfer impedance between said current and pick-up circuits, determining changes of the imposed transfer impedance in the pick-up circuit necessary to maintain the current flow therein substantially zero as the circuits traverse areas of water-covered earth, and determining the value of the imposed transfer impedance in the pick-up circuit necessary to maintain the current flow therein substantially zero with the earth mutual impedance removed from the current and pick-up circuits.

2. A method of geophysical exploration for surveying the earth formations beneath a body of water comprising: moving a current circuit containing a circulating alternating current through the water in close proximity to the bottom thereof; moving an electrical pick-up circuit along substantially the same path in the vicinity of the current circuit; first determining the mutual impedance beween said current and said pick-up circuits due to the cross-coupling between the circuits by the use of two separate adjustable electromotive forces induced in the pick-up circuit, said separate electromotive forces having different phases; then continuously determining the mutual impedance between said current and said pick-up circuits due to the combination of the cross-coupling between the circuits and the impedance of the earth between the circuits by the use of two separate adjustable electromotive forces having different phases whereby the impedance due to earth is obtained by subtracting the impedance due to cross-coupling from the total impedance.

References Cited in the file of this patent

UNITED STATES PATENTS

| | | |
|---|---|---|
| 1,665,397 | Wunsch | Apr. 10, 1928 |
| 1,897,688 | Ambronn | Feb. 14, 1933 |
| 2,046,436 | Wascheck | July 7, 1936 |
| 2,375,775 | Evjen | May 15, 1945 |
| 2,531,088 | Thompson | Nov. 21, 1950 |
| 2,551,337 | Roberts | May 1, 1951 |
| 2,839,721 | De Witte | June 17, 1958 |
| 2,931,972 | Tilley | Apr. 5, 1960 |

OTHER REFERENCES

Heiland: "Geophysical Exploration," Prentice-Hall, New York, 1940 (pages 695–696 relied upon).